United States Patent
Tsao et al.

(10) Patent No.: US 10,185,378 B2
(45) Date of Patent: Jan. 22, 2019

(54) PRIORITIZED SEQUENCING OF DEVICE INRUSH CURRENT

(71) Applicant: Microsoft Technology Licensing, LLC, Redmond, WA (US)

(72) Inventors: Jay Shih Tsao, Kirkland, WA (US); Robert Allen Shearer, Woodinville, WA (US); Jonathan Ross, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 158 days.

(21) Appl. No.: 15/284,053

(22) Filed: Oct. 3, 2016

(65) Prior Publication Data

US 2018/0095510 A1   Apr. 5, 2018

(51) Int. Cl.
*G06F 1/26* (2006.01)
*G06F 1/32* (2006.01)

(52) U.S. Cl.
CPC ........... *G06F 1/26* (2013.01); *G06F 1/266* (2013.01); *G06F 1/325* (2013.01); *G06F 1/3237* (2013.01); *G06F 1/3287* (2013.01)

(58) Field of Classification Search
None
See application file for complete search history.

(56) References Cited

U.S. PATENT DOCUMENTS

| | | | |
|---|---|---|---|
| 7,370,220 B1 | 5/2008 | Nguyen et al. | |
| 7,689,852 B2 | 3/2010 | Hwang et al. | |
| 7,739,528 B2 | 6/2010 | Zhuang et al. | |
| 7,770,044 B2 | 8/2010 | Bibikar et al. | |
| 8,004,352 B1 | 8/2011 | Wang et al. | |
| 8,275,423 B2 | 9/2012 | Matson et al. | |
| 8,279,646 B1 | 10/2012 | Hamstra | |
| 8,316,252 B2 | 11/2012 | Mantor et al. | |
| 8,633,751 B2 | 1/2014 | Hegde | |
| 8,806,253 B2 | 8/2014 | Niggemeier et al. | |

(Continued)

FOREIGN PATENT DOCUMENTS

EP    2369509 A1    9/2011

OTHER PUBLICATIONS

K. Lew, Jason, "Low Power System Design Techniques Using FPGAs", Published on: Nov. 1, 2004 Available at: http://www.eetimes.com/document.asp?doc_id=1271155.

(Continued)

*Primary Examiner* — Nitin C Patel

(57) ABSTRACT

Input power sequencing implementations for electronic, processing, and computing systems are presented herein. In one example, a method of providing power to operational elements of an electronic system is provided. The method includes maintaining sequencing information for the operational elements that indicates relative priorities and inrush delays for each of the operational elements. Responsive to ones of the operational elements requesting transition to a powered state, the method includes placing at least indications of the ones of the operational elements into a queue, establishing a power sequencing process for servicing the queue based at least on the sequencing information associated with the operational elements in the queue, and initiating the power sequencing process to provide input power to the operational elements in the queue.

20 Claims, 4 Drawing Sheets

(56) References Cited

U.S. PATENT DOCUMENTS

| | | |
|---|---|---|
| 9,104,421 B2 | 8/2015 | Ahmad et al. |
| 9,252,774 B2 | 2/2016 | Gupta et al. |
| 9,310,783 B2 | 4/2016 | Machnicki et al. |
| 9,360,908 B2 | 6/2016 | Alshinnawi et al. |
| 2003/0056125 A1 | 3/2003 | O'Conner et al. |
| 2006/0053324 A1* | 3/2006 | Giat ................. H04L 12/10 713/300 |
| 2010/0056278 A1 | 3/2010 | Mattice et al. |
| 2010/0269074 A1* | 10/2010 | Nation ............ G06F 17/5022 716/136 |
| 2013/0205104 A1 | 8/2013 | Hesse |
| 2014/0164812 A1* | 6/2014 | Alshinnawi ............ G06F 1/26 713/330 |
| 2015/0346806 A1 | 12/2015 | Dalal et al. |
| 2017/0075408 A1* | 3/2017 | Banerjee ............ G06F 1/3287 |

OTHER PUBLICATIONS

"International Search Report and Written Opinion Issued in PCT Application No. PCT/US2017/053349", dated Dec. 22, 2017, 10 Pages.

* cited by examiner

PRIORITIZED SEQUENCING OF DEVICE INRUSH CURRENT

BACKGROUND

Electronic devices and systems can include various sub-elements that can receive individualized input power. This input power can be applied or removed as-needed, such as to perform within low power architectures that place various components into low-power or off modes when not in use. Individual portions of microprocessors or system-on-a-chip (SoC) devices can also include separate power domains that can be powered on and off independently of each other. These techniques can be referred to as power gating, and are often employed to conserve power in electronic devices, such as in computers, handheld devices, smartphones, gaming systems, and the like.

OVERVIEW

Input power sequencing implementations for electronic, processing, and computing systems are presented herein. In one example, a method of providing power to operational elements of an electronic system is provided. The method includes maintaining sequencing information for the operational elements that indicates relative priorities and inrush delays for each of the operational elements. Responsive to ones of the operational elements requesting transition to a powered state, the method includes placing at least indications of the ones of the operational elements into a queue, establishing a power sequencing process for servicing the queue based at least on the sequencing information associated with the operational elements in the queue, and initiating the power sequencing process to provide input power to the operational elements in the queue.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Computing systems and devices, typically include power control systems to handle various power conditioning, voltage regulation, and power management functions. These power management functions can include selectively powering on and off various portions of the operational elements to conserve power and reduce heat generation by the associated devices. Moreover, individual portions of microprocessors or system-on-a-chip (SoC) devices can also include separate power domains that can be powered on and off independently of each other.

When powering these individual components back on, or into an active state, the components can draw a larger than normal amount of current, namely an inrush current. If several components are powered on simultaneously, the inrush current can exceed design limits of the power control elements or of other circuit protection elements. An electrical designer might have to include a larger than nominal power supply to handle the spikes in current attributed to the inrush conditions. Some systems employ a fixed and uniform timer to wait between powering up of components to limit inrush current. However, a uniform timer increases latency of power-on operations, and excess time is spent waiting instead of powering on additional components. Additionally, latencies can become problematic when trying to avoid inrush problems by using staggered power-on procedures for electronic components or portions of processing devices.

Advantageously, the examples herein enhance power-on sequencing to reduce latency and prevent inrush currents from exceeding desired limits. User-programmable sequencing and timings are also provided to establish priorities among the various operational elements of an associated computing system or electronic device. Technical effects include reduced power system component size and battery size due to the reduced inrush current. Moreover, faster power-on times are provided, along with prioritization among the various power-on processes.

Figure 1:
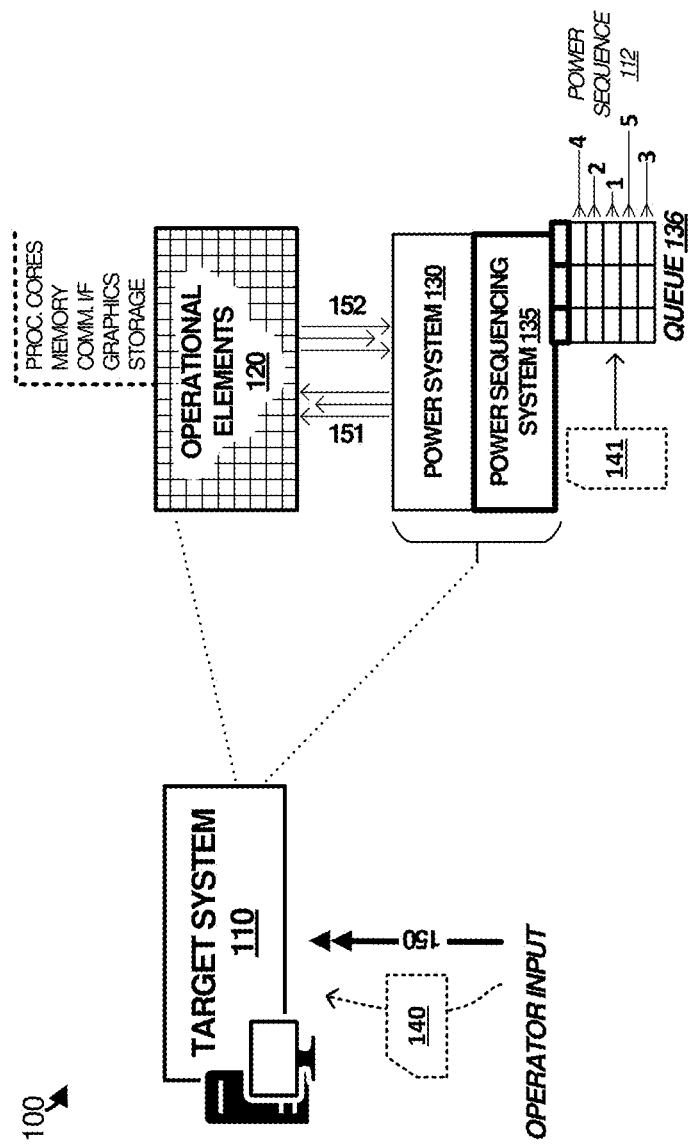
FIG. 1 illustrates a device power control environment in an implementation.

As a first example, FIG. 1 is provided. FIG. 1 illustrates device power control environment 100 in an implementation. Environment 100 includes target system 110 which further comprises operational elements 120, power system 130, and sequencer 135. Operational elements 120 can include processing core elements, memory elements, communication interface elements, graphics elements, and storage elements, among other elements. Each of operational elements 120 can receive power independently of each other from power system 130, and can individually request power-on or wake up from power system 130. Power sequencing system 135 can receive user-programmable sequencing and delay information 140 over link 150.

In operation, information 140 can be employed to established wake up sequencing and delays in queue 136 for power-on operations of power system 130. Power system 130 provides power to ones of the operational elements over power links 151. Links 152 are provided for operational elements to issue wake up or power-on requests to power sequencing system 135. Although links 151-152 are shown in FIG. 1, it should be understood that links 151-152 can comprise any number of links, comprising power, communication, control, or other physical and logical links. Also, although power system 130 and power sequencing system 135 are illustrated as separate elements in FIG. 1, it should be understood that these can be combined into similar elements.

In operation, operational elements 120 can transfer requests over links 152 for wake up into powered-on states. The requests can be entered into wake up queue 136 and serviced according to user-defined prioritization as well as latency/inrush factors. For example, if a system has four operational elements that are in a powered-off state, these elements might request a powered-on state due to various operational status. Each operational element requesting wake up/power-on can be placed into wake up queue 136 and assigned a relative priority among the other components in the queue. Additionally, each operational element in the queue can have an associated delay or wait timer. Power sequencing system 135 adds wake up requests into wake up queue 136 according to a relative priority, or alternatively adds according to a time or receipt, and then the sequencer "de-queues" according to the relative priority and associated wake up latency times to provide power for each element in the wake up queue. A latency timer unique to each component is provided to delay wake up of a subsequent component in the queue to avoid inrush current overlap with a previous component.

Figure 2:
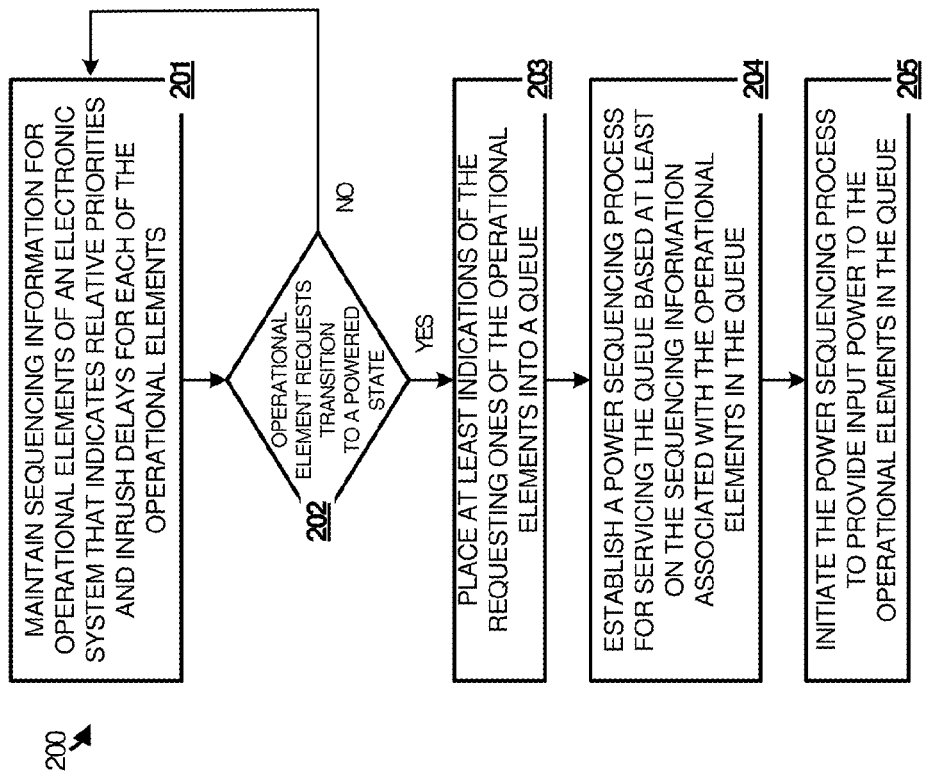
FIG. 2 illustrates operation of a device power control environment in an implementation.

To further illustrate the operations of elements of environment 100, FIG. 2 is provided. In FIG. 2, power sequencing system 135 maintains (201) sequencing information 141 for operational elements 120 of target system 110 that indicates relative priorities and inrush delays for each of the operational elements. This sequencing information can be stored in one or more storage devices or storage elements of system 110, such as storage media. In some examples, a user interface or programming interface is presented to an operator or user of system 110. This interface can be used to receive the sequencing information, such as relative wake up priorities or inrush delay times. In FIG. 1, an operator might transfer this as information 140 over link 150. The sequencing information can be updated by power sequencing system 135 according to user input, monitored feedback, or other input. For example, power sequencing system 135 might monitor how long a particular operational element takes to arrive into a functional state after application of power. Power sequencing system 135 can update the sequencing information with a new inrush delay according to the measured value.

Over time, ones of the operational elements 120 can enter powered-off states, sleep states, hibernation states, or other low-power states, such as due to inactivity. Power system 130 can cease providing power to these elements when in a powered-off state, or can provide a lower level or modified power/current when in a low-powered state. Once these operational elements desire to wake up from the low/no-power states, the individual elements can issue requests for transition to a powered state (202). These requests can comprise interrupts, wake up requests, or other specialized messaging that indicates which operational element is requesting power, among other information. The requests can be issued over links 152, and power system 130 can receive the requests and pass along to power sequencing system 135. In other examples, the requests are issued directly to power sequencing system 135.

Responsive to these requests, power sequencing system 135 places (203) indications of the requesting ones of the operational elements into queue 136. The indications can include an identifier for the specific operational element for which a request is received, along with indications of an associated priority and inrush delay. In some examples, the requests are placed into the queue according to a priority associated with the operational element that made the requests, such as at the 'head' of the queue. In other examples, the requests are placed into the queue according to an order or receipt of the requests. In FIG. 1, queue 136 includes five rows corresponding to five requests from associated operational elements. If more or fewer requests are received, then a corresponding number of requests can populate the queue.

Power sequencing system 135 establishes (204) power sequencing process 112 for servicing queue 136 based at least on sequencing information 141 associated with the operational elements in the queue. The sequencing process can be based on the relative priority among the operational elements in queue 136, where the relative priority is established by operator input or previously within information 141. The sequencing process can also be based on the associated inrush delays associated with each operational element in the queue. For example, operational elements with shorter inrush delays can be prioritized ahead of operational elements with longer inrush delays. Other ordering can be determined to establish power sequencing process 112.

Once power sequencing process 112 is established, then power sequencing system 135 initiates (205) power sequencing process 112 to provide input power to the operational elements in the queue. In FIG. 1, one example power sequencing process is indicated by the numerical designators 1, 2, 3, 4, and 5. In this example, queue 136 is serviced out of order and according to a sequence established by power sequencing system 135. In other examples, requests can be placed into queue 136 according to a priority and queue 136 can be serviced in row-by-row order.

To provide input power to the operational elements, power sequencing system 135 can instruct power system 130 to provide power over associated links 151 to the appropriate operation elements according to the sequencing and inrush delays. In other examples, power sequencing system 135 can control the power distribution of various power switching or power throttling elements and provide the associated power to the operational elements. It should be noted that the process of providing power is employed to denote entry of an operational element into an active state from an inactive state. The inactive state can include powered-off states or reduced power states. Entry into a wake up state or active state can comprise providing power by way of current/voltage to a particular operational element or can comprise ramping up power into a higher current/voltage state for the operational element. Other processes to provide power to particular operational elements can be employed, such as power gating, power switching, clock frequency control, or other techniques, including combinations thereof.

Figure 3:
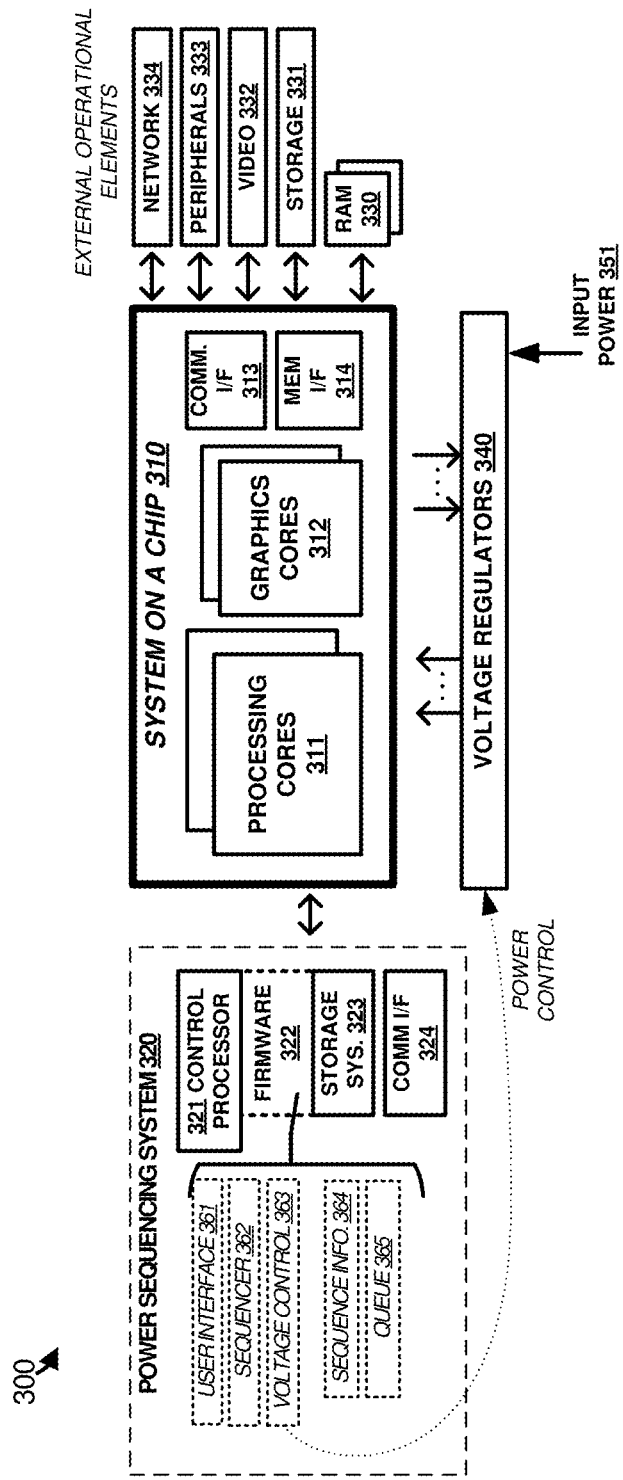
FIG. 3 illustrates a device power control environment in an implementation.

As a further example of power sequencing techniques and implementations, FIG. 3 is provided. FIG. 3 is a system diagram illustrating power sequencing environment 300. Environment 300 includes a system-on-a-chip (SoC) element along with other associated elements. Specifically, environment 300 includes SoC 310, power sequencing system 320, external operational elements 330-334, voltage regulators 340. SoC 310 further includes internal operational elements 311-314. Power sequencing system 320 includes control processor 321, firmware 322, storage system 323, and communication interface 324.

Power sequencing system 320 can communicate with any of the elements of FIG. 3, such as SoC 310, external operational elements 330-334, internal operational elements 311-314, and voltage regulators 340. External operational elements 330-334 can communicate with SoC 310 over associated communication interfaces, and can receive power from voltage regulators 340. SoC 310 and associated internal operational elements 311-314 can communicate internally over associated busses and communication interfaces, and can receive power from voltage regulators over associated power links. The various operational elements in FIG. 3 can issue one or more wake up requests for delivery to power sequencing system 320. These wake up requests might be issued directly to power sequencing system 320 or can be routed through control portions of voltage regulators 340, system management busses, such as I2C (Inter-Integrated Circuit) or SMB (System Management Bus), or over other communication interfaces, including wired, wireless, optical, logical interfaces, and application programming interfaces (APIs).

Figure 4:
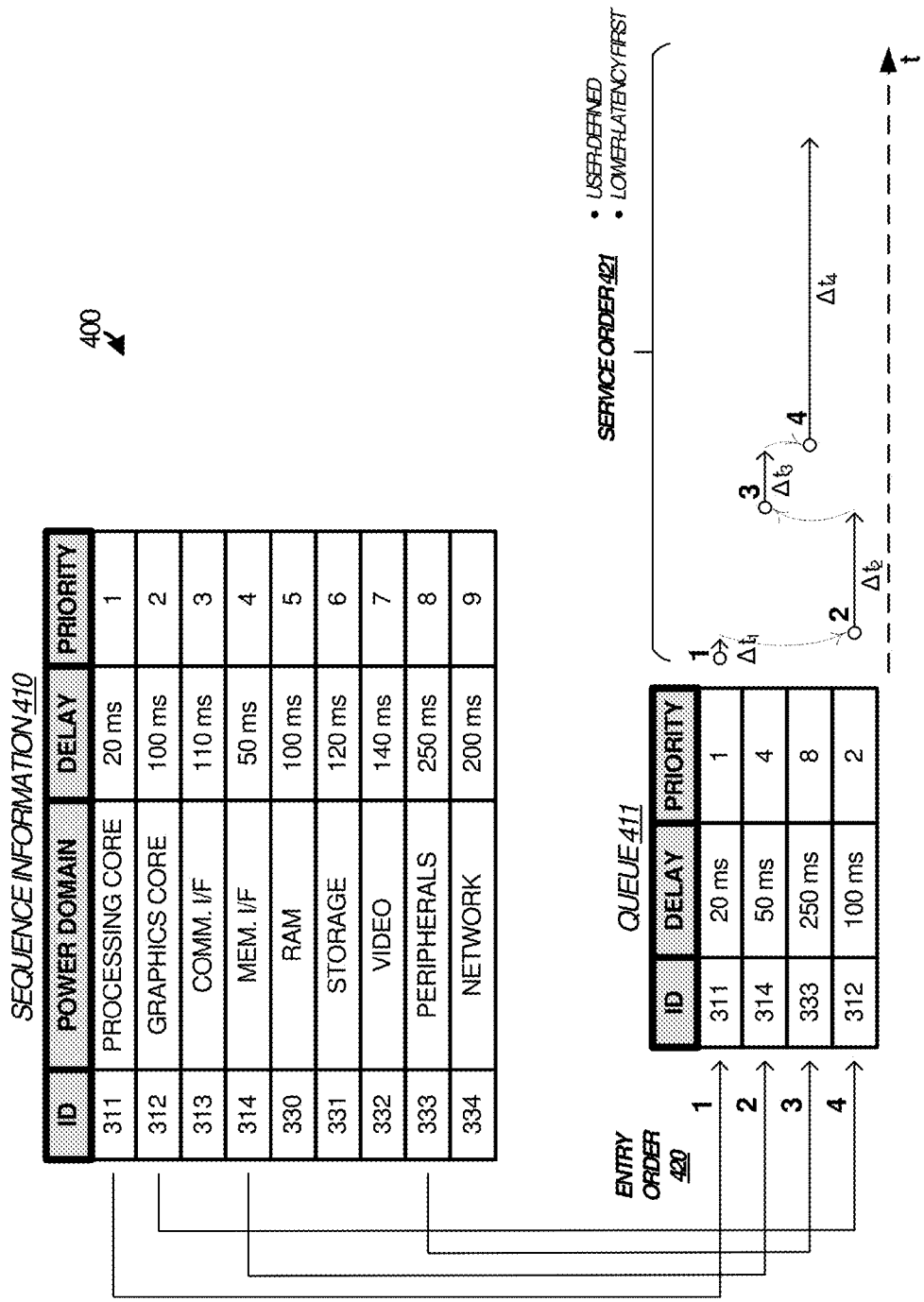
FIG. 4 illustrates operation of a device power control environment in an implementation.

A further discussion regarding the operation of the elements of environment 300 follows. Portions of FIG. 4 are also included in the discussion to further illustrate various aspects of the power sequencing techniques and implementations. Various operational elements can receive power provided by voltage regulators 340, including external operational elements 330-334 and internal operational elements 311-314, along with other elements including support equipment and connected peripherals. Voltage regulators 340 provide supply current to the operational elements at one or more output voltages. Input power 351 can be filtered and converted to provide these one or more output voltages.

Various control circuitry can be included in voltage regulators 340 or SoC 310 to selectively switch power to the operational elements according to the operational needs to system 300. As discussed above, these operational needs can include low power or powered off modes when power management techniques are employed. The power management techniques can include suspend, hibernation, or sleep modes of operation during which the associated operational elements either cease to function or are operated in a reduced functionality mode. These operational elements might desire to wake up from the off modes or reduced power modes, such as due to user interaction, processing needs, software processes, external access, or other wake up events. Responsive to this, these operational elements can issue one or more interrupt events or wake up requests to enter into a functional mode of operation.

Sequencer 362 of power sequencing system 320 can receive notification of these requests or interrupts, and these requests can be passed through elements of SoC 310 or voltage regulators 340 to reach power sequencing system 320. Responsive to the requests, sequencer 362 places indications corresponding to operational elements making the requests into queue 365. FIG. 4 shows queue 411 as an example data structure for queue 365, although other examples and configurations are possible. Queue 411 indicates four operational elements that issued requests for wake up. A first column of queue 411 indicates an identifier of the operational element, namely the element number from FIG. 3. Other identifiers can be employed, such as logical addresses, logical names, aliases, or other identifiers. A second column of queue 411 indicates an inrush delay associated with each operational element. The inrush delay indicates a wait or time delay from initial application of power to the operational element. The time delay corresponds to a time during which power-on processes of the operational element consumes an inrush current, or higher than normal surge in current from various internal circuitry receiving initial power. Once the time delay has expired, then the inrush current has fallen below a threshold level for the operational element, and a subsequent operational element can receive power. A third column of queue 411 indicates a priority of the associated operational element. This priority can be established by an operator or user, such as in sequence information 410, can be established by relative position within queue 411, or can be established based on the inrush delay (such as elements with lower inrush delays prioritized above elements with higher inrush delays).

To establish the information placed within queue 411, sequencer 362 can pull information from sequence information 410. FIG. 4 illustrates indications of four operational elements placed into queue 411 from sequence information 410. Sequence information 410 is an example data structure for sequence information 364, although other examples and configurations are possible. Sequence information indicates identifiers, inrush delays, and priorities for the various operational elements controlled by sequencer 362. As can be seen in FIG. 4, each identifier corresponds to an operational element of FIG. 3, along with a description. The inrush delay describes a minimum time to wait after application of power to the associated operational element. The priority indicates a relative prioritization among the various elements when multiple concurrent requests are to be handled or serviced by sequencer 362.

To establish the data within sequence information 410, power sequencing system 320 can be pre-programmed with default values during development or manufacture, can receive user or operator input, or can alter values according to measurements performed on the operational elements during wake up processes, among other considerations. The user or operator input can be received over user interface 361. User interface 361 can be presented as a terminal interface, graphical user interface, application programming interface (API), or register programming interface. The operator can specify one or more of the parameters included in sequence information 410 to control operation of wake up processes in environment 300.

The inrush delays are programmable delays that can be used to adjust the hardware sequencing for wake up processes. The inrush delay can be referred to as a wake up latency. Since each operational element might have a different associated inrush current and time to complete a wake up sequence, each element has a corresponding latency from application of power until functionality has been achieved. The relative priority is implemented to allow components to be turned on earlier in a sequence than others. In some examples, the priority is established based on associated inrush delays, so that operational elements that have lower latencies can be powered on before operational elements with higher latencies. Blocking among operational elements can also be performed by sequencer 362 based on the priorities established in sequence information 410. The blocking prevents a subsequent operational element from starting a wake up process until another event occurs to unblock the wake up process. These other events can include a signal or notification from the operational element that it has completed a wake up process, among other notifications.

Once requesting operational elements have been placed into queue 411, sequencer 362 can initiate wake up processes for each of the elements according to a power sequencing process. The power sequencing process can comprise an order of priority indicated by queue 411. As discussed herein, an order of priority can be indicated within queue 411 for each operational element, but a physical order within queue 411 might not correspond to the order in which the operational elements are serviced out of queue 411. Alternatively, operational elements can be placed in a particular order when enqueued into queue 411, and the de-queue process can occur in that particular order. Regardless of the ordering within queue 411, sequencer 362 de-queues elements within queue 411 according to their associated priority.

In FIG. 4, queue 411 indicates four elements with a priority of 1, 4, 8, and 2. However, these operational elements are then powered on in order of 1, 2, 4, 8. Service order 421 further illustrates the wake up process for these elements with associated latencies or inrush delays indicated by a corresponding length in the horizontal time (t) axis. Specifically, a wake up process for operational element 311 is initiated first, followed by a wait time corresponding to the inrush delay of 20 milliseconds (ms). Once the 20 ms inrush delay expires for operational element 311, a wake up process for operational element 312 is initiated followed by a wait time corresponding to the inrush delay of 100 ms. Once the 100 ms inrush delay expires for operational element 312, a wake up process for operational element 314 is initiated followed by a wait time corresponding to the inrush delay of 50 ms. Finally, once the 50 ms inrush delay expires for operational element 314, a wake up process for operational element 333 is initiated followed by a wait time corresponding to the inrush delay of 250 ms. It should be understood that the wait times and priorities are merely exemplary, and other configurations are possible. Also, as discussed herein, the order of priority can be established arbitrarily based on user-defined input, or can be established based on lowest-latency-first techniques. In lowest-latency-first examples, operational elements placed within queue 411 are serviced according to the inrush delay, so that wake up processes for operational elements with lower inrush delays are initiated before wake up processes for operational elements with higher inrush delays.

Voltage control 362 can be employed with sequencer 362 to control voltage regulators 340 and establish power control for the operational elements. For example, sequencer 362 can initiate the wake up processes via notifications or indications transferred to voltage control 362. Voltage control 362 can then determine which operational element is to receive power or begin a wake up process and instruct voltage regulators 340 to provide the associated power to the operational element. Various control circuitry can be included in voltage regulators 340 to receive instruction from voltage control 362 and responsively apply power to the associated operational elements. Individualized power control is provided by voltage regulators 340, or associated circuitry. This power control can be achieved using current/voltage switches to selectively provide power, or can be achieved using control signals provided to each operational element, such as gating signals, wake up signaling, or control of associated clock signaling.

Returning to a discussion of the elements of FIG. 3, power sequencing system 320 illustrates a control system that is representative of any system or collection of systems in which the various operational architectures, scenarios, and processes disclosed herein may be implemented. For example, power sequencing system 320 can be used to implement any of the control elements of FIG. 1, such as power system 130 or power sequencing system 135.

Power sequencing system 320 can be implemented by various elements that include, but are not limited to, computers, gaming systems, smartphones, laptop computers, tablet computers, desktop computers, server computers, hybrid computers, rack servers, web servers, cloud computing platforms, and data center equipment, as well as any other type of physical or virtual machine, and other computing systems and devices, as well as any variation or combination thereof. Power sequencing system 320 may be implemented as a single apparatus, system, or device or may be implemented in a distributed manner as multiple apparatuses, systems, or devices. Power sequencing system 320 includes, but is not limited to, control processor 321, firmware 322, storage system 323, and communication interface 324. Control processor 321 is operatively coupled with storage system 323, communication interface system 507, and user interface system 508.

Control processor 321 loads and executes firmware 322 from storage system 323. Firmware 322 includes user interface 361, sequencer 362, voltage control 363, sequence information 364, and queue 365 which is representative of the processes, services, and platforms discussed with respect to the preceding Figures. Sequence information 364 and queue 365 comprise data structures that hold various data associated with operations of firmware 322.

When executed by control processor 321 to provide enhanced power sequencing services, among other services, firmware 322 directs control processor 321 to operate as described herein for at least the various processes, operational scenarios, and sequences discussed in the foregoing implementations. Power sequencing system 320 may optionally include additional devices, features, or functionality not discussed for purposes of brevity.

Referring still to FIG. 3, control processor 321 may comprise a micro-processor and processing circuitry that retrieves and executes firmware 322 from storage system 323. Control processor 321 may be implemented within a single processing device, but may also be distributed across multiple processing devices or sub-systems that cooperate in executing program instructions. Examples of control processor 321 include general purpose central processing units, application specific processors, and logic devices, as well as any other type of processing device, combinations, or variations thereof.

Storage system 323 may comprise any computer readable storage media readable by control processor 321 and capable of storing firmware 322. Storage system 323 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 323 may also include computer readable communication media over which at least some of firmware 322 may be communicated internally or externally. Storage system 323 may be implemented as a single storage device, but may also be implemented across multiple storage devices or sub-systems co-located or distributed relative to each other. Storage system 323 may comprise additional elements, such as a controller, capable of communicating with control processor 321 or possibly other systems.

Firmware 322 may be implemented in program instructions and among other functions may, when executed by control processor 321, direct control processor 321 to operate as described with respect to the various operational scenarios, sequences, and processes illustrated herein. For example, firmware 322 may include program instructions for implementing enhanced power sequencing services, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Firmware 322 may include additional processes, programs, or components, such as operating system software or other application software, in addition to or that including user interface 361, sequencer 362, voltage control 363, sequence information 364, and queue 365. Firmware 322 may also comprise firmware or some other form of machine-readable processing instructions executable by control processor 321.

In general, firmware 322 may, when loaded into control processor 321 and executed, transform a suitable apparatus, system, or device (of which power sequencing system 320 is representative) overall from a general-purpose computing system into a special-purpose computing system customized to provide enhanced power sequencing services, among other services. Indeed, encoding firmware 322 on storage system 323 may transform the physical structure of storage system 323. The specific transformation of the physical structure may depend on various factors in different implementations of this description. Examples of such factors may include, but are not limited to, the technology used to implement the storage media of storage system 323 and whether the computer-storage media are characterized as primary or secondary storage, as well as other factors.

For example, if the computer readable storage media are implemented as semiconductor-based memory, firmware 322 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Turning now to the elements of firmware 322, sequencer 362 provides for prioritized sequencing of wake up events for operations elements by employing at least queue 365 populated with portions of sequence information 364. Sequencer 362 can instruct voltage control 363 to establish power control over the various operational elements using at least control circuitry in voltage regulators 340. Requests for wake up events can be received by sequencer 362 over communication interface 324 or other logical or physical interfaces. Voltage control 363 can control portions of voltage regulators 340 to selectively provide power to operational elements according to a sequence indicated by queue 365, along with any associated inrush delays specified in sequence information 364. Voltage control 363 can also reduce power or power down the operational elements in accordance with power management techniques and hibernation/sleep mode operations of SoC 310. Voltage control 363 can provide for clock frequency throttling in addition to voltage/current control of voltage regulators 340.

User interface 361 provides for user input and output related to sequencing information and status of power sequencing system 320. Operators or users can interface through user interface 361 to provide portions of sequence information 364. User interface 361 can receive input and provide output over a programming interface, and can be carried over communication interface 324. In network examples, user interface 361 might include web interfaces and terminal interfaces. User interface 361 can packetize display or graphics data for remote display by a display system or computing system coupled over one or more network interfaces or web interfaces. Physical or logical elements of user interface 361 can provide alerts or visual outputs to users or other operators. User interface 361 may also include associated user interface software executable by control processor 321 in support of the various user input and output operations discussed above. Separately or in conjunction with each other and other hardware and software elements, the user interface software and user interface devices may support a graphical user interface, a natural user interface, or any other type of user interface. In further examples, user interface 361 may interface with an operator via a touchscreen, keyboard, mouse, voice input device, audio input device, or other touch input device for receiving input from a user. Output devices such as a display, speakers, web interfaces, terminal interfaces, and other types of output devices may also be interfaced by user interface 361.

Communication interface 324 may include communication connections and devices that allow for communication with various operational elements, user interfaces, SoC devices, or communication networks. Examples of connections and devices that together allow for inter-system communication may include system management interfaces, network interfaces, network interface cards, communication busses, antennas, RF circuitry, transceivers, and other communication circuitry. The connections and devices may communicate over communication media to exchange communications with other computing systems or networks of systems, such as metal, glass, air, or any other suitable communication media.

Communication between power sequencing system 320 and other computing systems, such as operator systems or end user terminals, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of providing power to operational elements of an electronic system, the method comprising maintaining sequencing information for the operational elements that indicates relative priorities and inrush delays for each of the operational elements. Responsive to ones of the operational elements requesting transition to a powered state, the method includes placing at least indications of the ones of the operational elements into a queue, establishing a power sequencing process for servicing the queue based at least on the sequencing information associated with the operational elements in the queue, and initiate the power sequencing process to provide input power to the operational elements in the queue.

Example 2

The method of Example 1, further comprising presenting a programming interface to a user, and receiving, over the programming interface, indications of the sequencing information to establish the relative priorities and the inrush delays for one or more of the operational elements. The method also includes storing the indications of the sequencing information in one or more storage media.

Example 3

The method of Examples 1-2, where the sequencing information is configured to establish a target power-on latency among the operational elements requesting transition to the powered state while maintaining associated inrush current for the electronic system below a threshold level.

Example 4

The method of Examples 1-3, further comprising, responsive to receiving requests for powered state transitioning for the ones of the operation elements, retrieving associated sequencing information for the ones of the operation elements and placing the associated sequencing information into the queue.

Example 5

The method of Examples 1-4, where placing the associated sequencing information into the queue comprises placing the associated sequencing information in the queue according to an order in which the requests for the powered state transitioning are received, and where establishing the power sequencing process for servicing the queue comprises establishing an order for servicing the queue according to at least the relative priorities among the operational elements in the queue.

Example 6

The method of Examples 1-5, further comprising establishing the power sequencing process according to at least the relative priorities among the operational elements in the queue, and de-queuing the operational elements from the queue to execute the power sequencing process.

Example 7

The method of Examples 1-6, where initiating the power sequencing process comprises determining the relative priorities among the ones of the operational elements in the queue, and directing application of the input power to the ones of the operational elements in the queue according to ordering among the relative priorities, with an associated delay introduced between each subsequent application of the input power corresponding to an inrush delay indicated for each associated operational element.

Example 8

The method of Examples 1-7, further comprising establishing delays within the power sequencing process that correspond to the inrush delays indicated for each operational element in the queue.

Example 9

A power sequencing system for operational elements of an electronic system, comprising a configuration interface configured to receive sequencing information for the operational elements that indicates relative priorities and inrush delays for each of the operational elements, and a sequencer configured to place at least indications of ones of the operational elements into a queue responsive to requests from the ones of the operational elements for transition to a powered state. The sequencer is configured to establish a power sequencing process for servicing the queue based at least on the sequencing information associated with the operational elements in the queue, and initiate the power sequencing process to provide input power to the operational elements in the queue.

Example 10

The power sequencing system of Example 9, further comprising a power controller configured to provide the input power to associated ones of the operational elements in accordance with the power sequencing process.

Example 11

The power sequencing system of Examples 9-10, comprising the configuration interface configured to present a programming interface to a user, and receive, over the programming interface, indications of the sequencing information to establish the relative priorities and the inrush delays for one or more of the operational elements. The configuration interface configured to store the indications of the sequencing information in one or more storage media.

Example 12

The power sequencing system of Examples 9-11, where the sequencing information is configured to establish a target power-on latency among the operational elements requesting transition to the powered state while maintaining associated inrush current for the electronic system below a threshold level.

Example 13

The power sequencing system of Examples 9-12, comprising, responsive to receiving requests for powered state transitioning for the ones of the operation elements, the sequencer configured to retrieve associated sequencing information for the ones of the operation elements and placing the associated sequencing information into the queue.

Example 14

The power sequencing system of Examples 9-13, comprising, the sequencer configured to place the associated sequencing information in the queue according to an order in which the requests for the powered state transitioning are received, and the sequencer configured to establish an order for servicing the queue according to at least the relative priorities among the operational elements in the queue.

Example 15

The power sequencing system of Examples 9-14, comprising the sequencer configured to establish the power sequencing process according to at least the relative priorities among the operational elements in the queue, and the sequencer configured to de-queue the operational elements from the queue based at least on executing the power sequencing process.

Example 16

The power sequencing system of Examples 9-15, comprising the sequencer configured to initiate the power sequencing process by at least determining the relative priorities among the ones of the operational elements in the queue, and applying the input power to the ones of the operational elements in the queue according to ordering among the relative priorities, with an associated delay introduced between each subsequent application of the input power corresponding to an inrush delay indicated for each associated operational element.

Example 17

The power sequencing system of Examples 9-16, comprising the sequencer configured to establish delays within the power sequencing process that correspond to the inrush delays indicated for each operational element in the queue.

Example 18

A power control apparatus comprising one or more computer readable storage media, a processing system operatively coupled with the one or more computer readable storage media, and a power sequencing service comprising program instructions stored on the one or more computer readable storage media. Based at least on being read and executed by the processing system, the program instructions direct the processing system to at least maintain sequencing information for the operational elements that indicates relative priorities and inrush delays for each of the operational elements. Responsive to ones of the operational elements requesting transition to a powered state, the program instructions direct the processing system to place at least indications of the ones of the operational elements into a queue, establish a power sequencing process for servicing the queue based at least on the sequencing information associated with the operational elements in the queue, and direct input power to the operational elements in the queue according to the power sequencing process.

Example 19

The apparatus of Example 18, comprising further program instructions, based at least in part on execution by the computing system, direct the computing system to at least, responsive to receiving requests for powered state transitioning for the ones of the operation elements, retrieve associated sequencing information for the ones of the operation elements from one or more storage media, and place the associated sequencing information into the queue.

Example 20

The apparatus of Examples 18-19, comprising further program instructions, based at least in part on execution by the computing system, direct the computing system to at least initiate the power sequencing process by at least determining the relative priorities among the ones of the operational elements in the queue, and apply the input power to the ones of the operational elements in the queue according to ordering among the relative priorities, with an associated delay introduced between each subsequent application of the input power corresponding to an inrush delay indicated for each associated operational element.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the subject matter of this application. Those skilled in the art will also appreciate that the features described above can be combined in various ways to form multiple implementations. As a result, the invention is not limited to the specific implementations described above, but only by the claims and their equivalents.

What is claimed is:

1. A method of providing power to operational elements of an electronic system, the method comprising:
   maintaining sequencing information for the operational elements that indicates relative priorities and inrush delays for each of the operational elements;
   responsive to one or more of the operational elements requesting transition to a powered state, placing at least indications of the one or more of the operational elements into a queue;
   establishing a power sequencing process for servicing the queue with time delays between servicing each of the operational elements in the queue indicated by the inrush delays ordered using at least the relative priorities associated with the operational elements in the queue; and
   initiating the power sequencing process to provide input power to the operational elements in the queue.

2. The method of claim 1, further comprising:
   presenting a programming interface to a user;
   receiving, over the programming interface, indications of the sequencing information to establish the relative priorities and the inrush delays for one or more of the operational elements; and
   storing the indications of the sequencing information in one or more storage media.

3. The method of claim 1, wherein the sequencing information is configured to establish a target power-on latency among the operational elements requesting transition to the powered state while maintaining associated inrush current for the electronic system below a threshold level.

4. The method of claim 1, further comprising:
   responsive to receiving requests for powered state transitioning for the one or more of the operation elements, retrieving associated sequencing information for the one or more of the operation elements and placing the associated sequencing information into the queue.

5. The method of claim 4, wherein placing the associated sequencing information into the queue comprises placing the associated sequencing information in the queue according to an order in which the requests for the powered state transitioning are received, and wherein establishing the power sequencing process for servicing the queue comprises establishing an order for servicing the queue according to at least the relative priorities among the operational elements in the queue.

6. The method of claim 1, further comprising:
establishing the power sequencing process according to at least the relative priorities among the operational elements in the queue; and
de-queuing the operational elements from the queue to execute the power sequencing process.

7. The method of claim 1, wherein initiating the power sequencing process comprises:
determining the relative priorities among the one or more of the operational elements in the queue; and
directing application of the input power to the one or more of the operational elements in the queue according to ordering among the relative priorities, with an associated timing delay introduced between each subsequent application of the input power corresponding to an inrush delay indicated for each associated operational element.

8. The method of claim 1, further comprising:
establishing the time delays within the power sequencing process that correspond to the inrush delays indicated for each operational element in the queue.

9. A power sequencing system for operational elements of an electronic system, comprising:
a configuration interface configured to receive sequencing information for the operational elements that indicates relative priorities and inrush delays for each of the operational elements;
a sequencer configured to place at least indications of one or more of the operational elements into a queue responsive to requests from the one or more of the operational elements for transition to a powered state;
the sequencer configured to establish a power sequencing process for servicing the queue according to timing indicated by the inrush delays and ordered using at least the relative priorities associated with the operational elements in the queue; and
the sequencer configured to initiate the power sequencing process to provide input power to the operational elements in the queue.

10. The power sequencing system of claim 9, further comprising:
a power controller configured to provide the input power to associated one or more of the operational elements in accordance with the power sequencing process.

11. The power sequencing system of claim 9, comprising:
the configuration interface configured to present a programming interface to a user;
the configuration interface configured to receive, over the programming interface, indications of the sequencing information to establish the relative priorities and the inrush delays for one or more of the operational elements; and
the configuration interface configured to store the indications of the sequencing information in one or more storage media.

12. The power sequencing system of claim 9, wherein the sequencing information is configured to establish a target power-on latency among the operational elements requesting transition to the powered state while maintaining associated inrush current for the electronic system below a threshold level.

13. The power sequencing system of claim 9, comprising:
responsive to receiving requests for powered state transitioning for the one or more of the operation elements, the sequencer configured to retrieve associated sequencing information for the one or more of the operation elements and placing the associated sequencing information into the queue.

14. The power sequencing system of claim 13, comprising:
the sequencer configured to place the associated sequencing information in the queue according to an order in which the requests for the powered state transitioning are received; and
the sequencer configured to establish an order for servicing the queue according to at least the relative priorities among the operational elements in the queue.

15. The power sequencing system of claim 9, comprising:
the sequencer configured to establish the power sequencing process according to at least the relative priorities among the operational elements in the queue; and
the sequencer configured to de-queue the operational elements from the queue based at least on executing the power sequencing process.

16. The power sequencing system of claim 9, comprising:
the sequencer configured to initiate the power sequencing process by at least determining the relative priorities among the one or more of the operational elements in the queue, and applying the input power to the one or more of the operational elements in the queue according to ordering among the relative priorities, with an associated delay introduced between each subsequent application of the input power corresponding to an inrush delay indicated for each associated operational element.

17. The power sequencing system of claim 9, comprising:
the sequencer configured to establish the timing as delays within the power sequencing process that correspond to the inrush delays indicated for each operational element in the queue.

18. A power control apparatus comprising:
one or more computer readable storage media;
a processing system operatively coupled with the one or more computer readable storage media; and
a power sequencing service comprising program instructions stored on the one or more computer readable storage media that, based at least on being read and executed by the processing system, direct the processing system to at least:
maintain sequencing information for operational elements of a system-on-a-chip (SoC) device that indicates relative priorities and inrush delays for each of the operational elements;
responsive to target operational elements requesting transition to a powered state, place at least indications of the target operational elements into a queue;
establish a power sequencing process for servicing the queue according to timing indicated by the inrush delays and ordered using at least the relative priorities associated with the operational elements in the queue; and direct input power to the operational elements in the queue according to the power sequencing process.

19. The apparatus of claim 18, comprising further program instructions, based at least in part on execution by the computing system, direct the computing system to at least:
responsive to receiving requests for powered state transitioning for the target operation elements, retrieve associated sequencing information for the target operation elements from one or more storage media, and place the associated sequencing information into the queue.

20. The apparatus of claim 18, comprising further program instructions, based at least in part on execution by the computing system, direct the computing system to at least:
initiate the power sequencing process by at least determining the relative priorities among the target operational elements in the queue; and
apply the input power to the target operational elements in the queue according to ordering among the relative priorities, with an associated delay introduced between each subsequent application of the input power corresponding to an inrush delay indicated for each associated operational element.

* * * * *